(12) United States Patent
Rune

(10) Patent No.: US 6,304,913 B1
(45) Date of Patent: Oct. 16, 2001

(54) INTERNET SYSTEM AND METHOD FOR SELECTING A CLOSEST SERVER FROM A PLURALITY OF ALTERNATIVE SERVERS

(75) Inventor: Johan Rune, Lidingö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/189,100

(22) Filed: Nov. 9, 1998

(51) Int. Cl.[7] .......................... G06F 15/173; G06F 15/16
(52) U.S. Cl. .......................... 709/241; 709/243; 709/245
(58) Field of Search .......................... 712/27; 709/200, 709/203, 219, 238, 240, 241, 242, 243, 245, 244

(56) References Cited

U.S. PATENT DOCUMENTS

| 5,521,910 | 5/1996 | Matthews | 370/256 |
|---|---|---|---|
| 5,751,961 | 5/1998 | Smyk | 709/217 |

(List continued on next page.)

FOREIGN PATENT DOCUMENTS

| 0 817 444 | 1/1998 | (EP) . |
|---|---|---|
| WO 98 18076 | 4/1998 | (WO) . |
| WO 98 26559 | 6/1998 | (WO) . |
| WO 98 31107 | 7/1998 | (WO) . |

OTHER PUBLICATIONS

James D. Guyton et al., Locating Nearby copies of Replicated Internet Servers, University of Colorado at Boulder, Feb. 1995, 19 pages.*

Roland J. Schemers, III, lbnamed: A Load Balancing Name Server in Perl, 1995, LISA IX, Sep. 1995, 12 pages.*

(List continued on next page.)

*Primary Examiner*—Patrice Winder
(74) *Attorney, Agent, or Firm*—Jenkens & Gilchrist, A Professional Corporation

(57) ABSTRACT

A method and Internet system is provided that attempts to improve response times by automatically selecting for use a server (e.g., mirror server or alternative server) located relatively close to a requesting host. Alternatively, the method and Internet system can automatically select for use a server (e.g., alternative server) that is relatively appropriate for the requesting host. More specifically, the Internet system can operate to select the closest server or the most appropriate server from a plurality of servers providing the same service (e.g., mirror servers) or slightly adapted variants of the same service (e.g., alternative servers) each assigned a common host name and a unique Internet Protocol address. The Internet system includes a database (e.g., Domain Name System (DNS) server) for storing the common host name and the plurality of unique Internet Protocol addresses. The Internet system also includes a requesting host for transmitting a translation request containing the common host name to the database. In response to the translation request, a system (e.g., requesting host, router, dedicated server, or DNS server) operates to select the unique Internet Protocol address assigned to either the closest server (e.g., mirror server or alternative server) which is located the nearest to the requesting host or the server that is the most appropriate for the requesting host (e.g., mirror server or alternative server).

27 Claims, 13 Drawing Sheets

U.S. PATENT DOCUMENTS

| | | | |
|---|---|---|---|
| 5,774,660 | | 6/1998 | Brendel et al. ................ 709/201 |
| 5,777,989 | | 7/1998 | McGarvey ..................... 370/254 |
| 6,014,660 | * | 1/2000 | Lim et al. ................ 709/200 X |
| 6,052,718 | * | 4/2000 | Gifford ........................ 709/219 |
| 6,092,178 | * | 7/2000 | Jindal et al. ................... 712/27 |
| 6,154,777 | * | 11/2000 | Ebrahim ....................... 709/227 |
| 6,185,598 | * | 2/2001 | Farber et al. ................. 709/200 |
| 6,205,477 | * | 3/2001 | Johnson et al. .............. 709/220 |

OTHER PUBLICATIONS

Mr. Dns, Can I use DNS to direct people to the web closest to them?, Acme Byte and Wire, Mar. 1997, 1 page.*

Brian Riggs, Better Performance: ISPs Balance Internet Server Load: Cisco router software points client request to nearest available web server, LANTIMES online, Apr. 1997, 3 webpages.*

P. Mockapetris, RFC 1035: Domain Names—Implementation and Specification, Nov. 1997, 40 pages.*

Cisco Systems Inc., Distributed Director: Configuring Advanced features, Jan. 1997, 17 pages.*

"rfc1034—Domain Names: Concepts and Facilities" *Request for Comment*, 'Online!, Nov. 1987.

Peterson, L.L., "A Yellow–Pages Service For a Local–Area Network" *Computer Communications Review*, Aug. 1, 1988, pp. 235–242.

Colajanni, M. et al., "Adaptive TTL Schemes for Load Balancing of Distributed Web Servers"*Performance Evaluation Review*, Sep. 1, 1997, pp. 36–42.

EPO Search Report dated Jul. 13, 1999.

* cited by examiner

INTERNET SYSTEM AND METHOD FOR SELECTING A CLOSEST SERVER FROM A PLURALITY OF ALTERNATIVE SERVERS

BACKGROUND OF THE INVENTION

1. Technical Field of the Invention

The present invention generally relates to the Internet field and, in particular, to an Internet system and method for selecting a server located the closest to a user when multiple servers provide the same service (e.g., mirror servers) or slightly adapted variants of the same service (e.g., alternative servers).

2. Description of Related Art

The number of users accessing the Internet is growing exponentially which presents new challenges for service providers to reduce response times by developing new ways to distribute the increasing load. One such way to distribute the load is to use mirror servers located throughout the world. Each mirror server functions to store a copy of the same web site and as such can service a request by any user.

Consequently, the service providers have developed various schemes to select a particular mirror server to service the request of a user. For example, a round robin scheme has been used where the mirror servers are assigned to address the requests of the users on a rotational basis regardless of the load on any of the mirror servers. Other more sophisticated schemes have also been used, such as load-balancing schemes which attempt to select a particular mirror server based on load distribution requirements, or timing schemes which select a particular mirror server based on time of day or day of week requirements. Unfortunately, none of the current Internet systems take into account the geographical distance or number of routers located between each mirror server and a particular user to select a mirror server (or the source server) located relatively close to the particular user. Of course, the selection of a close mirror server (or the source server) should reduce the response time required to process a request by the particular user. In addition, it would reduce the overall network load by reducing the number of routers that are traversed by the IP packets.

Accordingly, there is a need for a method and Internet system that improves the response times by selecting for use a mirror server (or the source server) located relatively close to a particular user. This need is equally relevant for the task of selecting the closest of multiple distributed servers that provide essentially the same service, but may be slightly adapted for local service, that is, alternative servers that are not true mirror servers. These and other needs are satisfied by the Internet system and method of the present invention.

BRIEF DESCRIPTION OF THE INVENTION

The present invention is a method and Internet system that attempts to improve response times by automatically selecting for use a server (e.g., mirror server or alternative server) located relatively close to a requesting host. More specifically, the Internet system can operate to select the closest server from a plurality of servers providing the same service (e.g., mirror servers) or slightly adapted variants of the same service (e.g., alternative servers) each assigned a common host name and a unique Internet Protocol address. The Internet system includes a database (e.g., Domain Name System (DNS) server) for storing the common host name and the plurality of unique Internet Protocol addresses. The Internet system also includes a requesting host for transmitting a translation request containing the common host name to the database. In response to the translation request, a system (e.g., requesting host, router, dedicated server, or DNS server) operates to select the unique Internet Protocol address assigned to the closest server (e.g., mirror server or alternative server) which is located the nearest to the requesting host.

In accordance with the present invention, there is provided a method and Internet system for automatically selecting a closest alternative server without requiring a user to manually enter an Internet Protocol address or manually select a hypertext link to connect with the closest alternative server.

Also in accordance with the present invention, there is provided a method and Internet system for automatically selecting a closest alternative server from a plurality of alternative servers that include a source server and multiple mirror servers replicating the information of the source server and multiple distributed servers which provide the same service but may be slightly adapted for local service.

Further in accordance with the present invention, there is provided a method and Internet system that automatically selects a closest alternative server in response to a changing location of a mobile user.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1A:
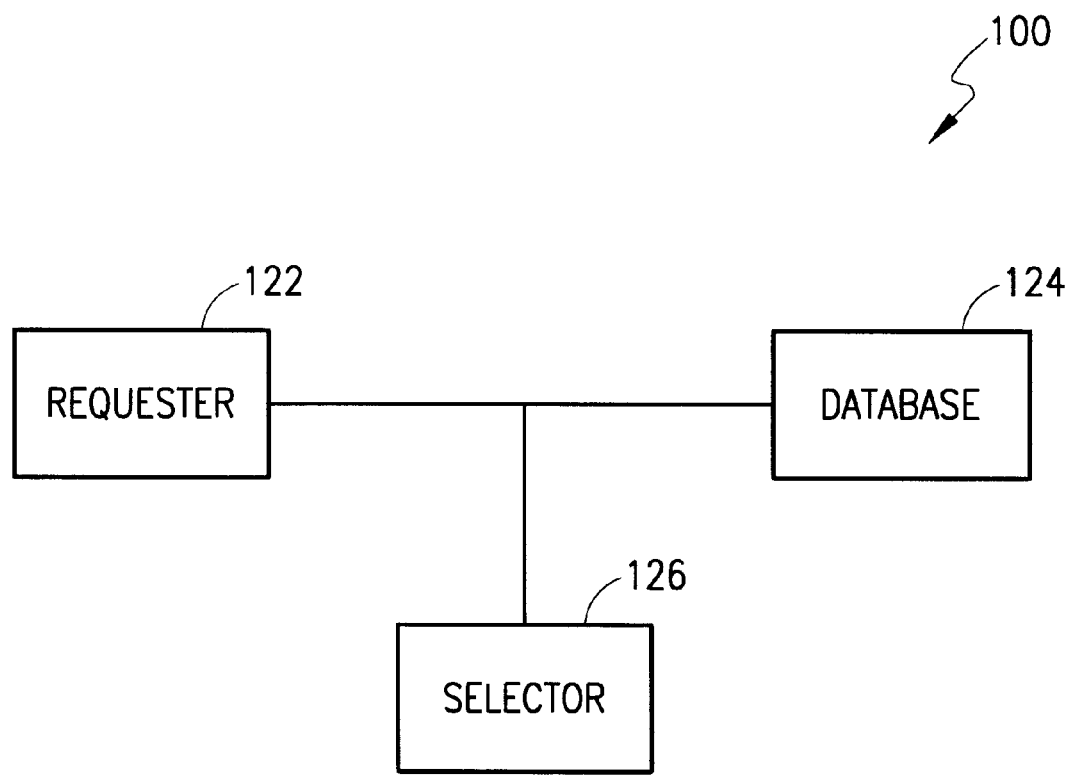
FIG. 1A is a block diagram illustrating the basic components associated with an exemplary Internet system of the present invention.

Referring to the Drawings, wherein like numerals represent like parts throughout FIGS. 1–13, there are disclosed an exemplary Internet system 100 (FIGS. 1A and 1B) and selection method 200 (FIGS. 2–13) in accordance with the present invention.

Referring to FIG. 1A, there is illustrated the basic components associated with the Internet system 100 of the present invention. Basically, the Internet system 100 includes requester 122 that transmits a translation request to a database 124. In response to the translation request, a selector 126 (see FIGS. 3–13) operates to select one of the servers (e.g., mirror server and alternative server) located nearer to the requester 122.

Figure 1B:
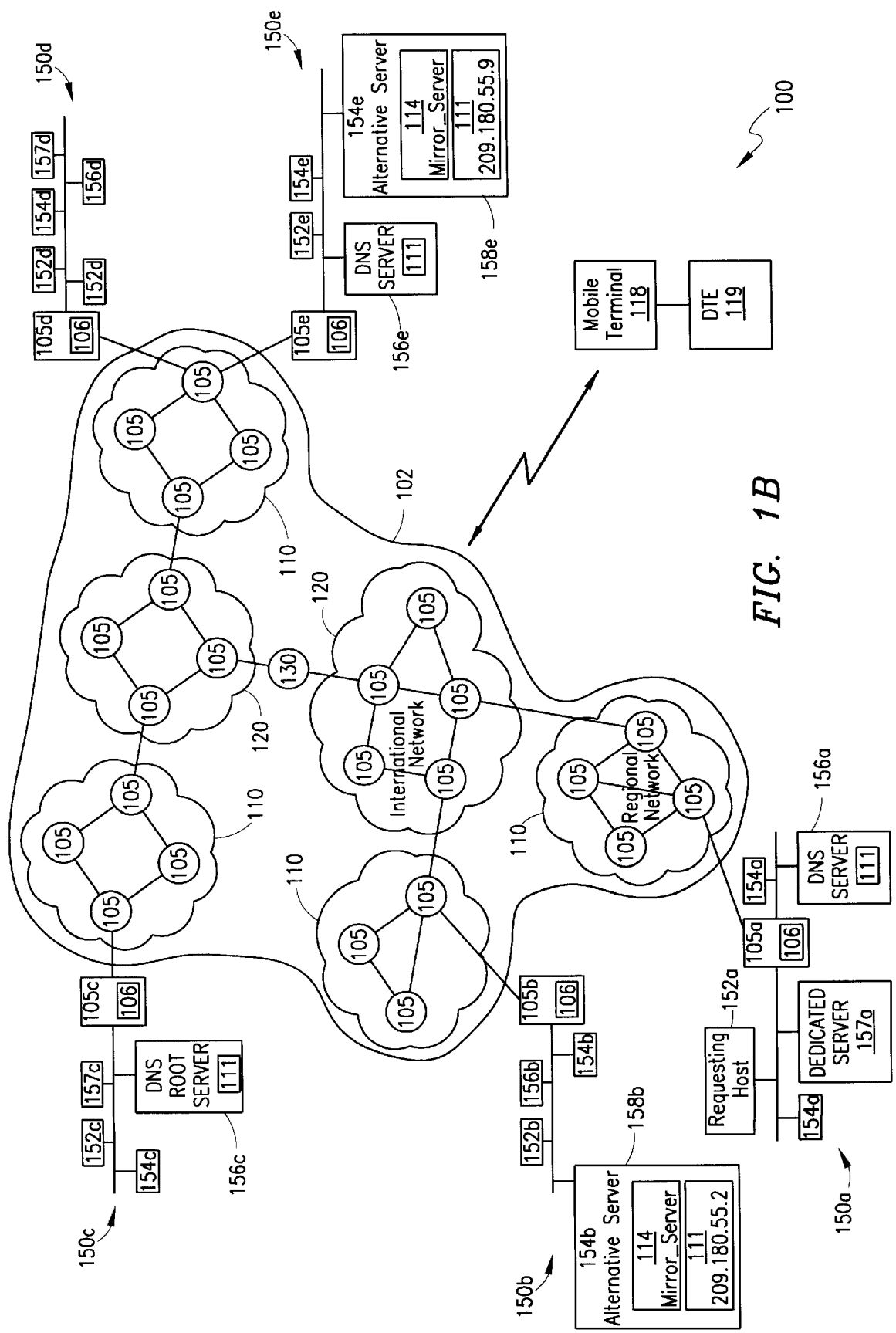
FIG. 1B is a block diagram illustrating in greater detail the exemplary Internet system.

Referring to FIG. 1B, there is illustrated a detailed block diagram of the Internet system 100 of the present invention. Certain details associated with the Internet system 100 are known in the industry and as such need not be described herein. Therefore, for clarity, the description provided below in relation to the Internet system 100 and the selection method 200 omits some components not necessary to understand the present invention.

Generally, the Internet system 100 operates to select an alternative server (e.g., alternative server 158b) located relatively close to, or which is relatively appropriate for, a requesting host (e.g., requesting host 152a). For example, the alternative server closest to the requesting host can be selected. The selection of the closest alternative server 158b from a set of alternative servers 158b and 158e providing the same service (e.g., mirror servers) or slightly adapted variants of the same service can be based on a hop count which indicates the number of routers that a packet from the requesting host must traverse to reach a given alternative server (see FIGS. 3–11). The most appropriate alternative server will have the smallest hop count. Alternatively, the selection of the closest alternative server 158b from the set of alternative servers 158b and 158e can be done using predefined instructions and a host name of the requesting host, where the predefined instructions determine a unique Internet Protocol address of the most appropriate alternative server based on a class of the host name of the requesting host (see FIGS. 12–13). In this case, the selected alternative server does not necessarily have to be the closest. For example, the most appropriate alternative server for a requesting host with a host name ending with ".se" (the country code of Sweden) may be an alternative server using the Swedish language. A detailed description of how the selection of the closest alternative server occurs is deferred pending a discussion of the architecture of the Internet system 100.

The Internet system 100 includes a set of user networks 150a–150e coupled to an Internet 102. The Internet 102 provides universal connectivity for users and is composed of a collection of regional networks 110, international networks 120 and network access points (NAP) 130. Each of the regional networks 110 and the international networks 120 includes a set of routers 105 that can be connected to one another in virtually any configuration, see FIG. 1 for illustrative examples. The user networks 150a–150e can be configured as a Local Area Network (LAN), a System Area Network (SAN) or a Wide Area Network (WAN). Also, each user network 150a–150e is a communication system designed to link together requesting host(s) 152a–152e, file server(s) 154a–154e, a Domain Name System (DNS) server 156a–156e, a dedicated server 157a–157e (optional) and routers 105a–105e.

In the illustrated example, the file servers 154b and 154e associated with the user networks 150b and 150e are further classified as alternative servers 158b and 158e, respectively.

Each alternative server 158b or 158e either stores a copy of an entire Internet site, (e.g., a web site) or contains a slightly adapted version of a common service so that any of the alternative servers can service a request from one of the requesting hosts 152a–152e. It should be understood that when mirror servers are used, also the source server (whose information is replicated by the mirror servers) can service a request from one of the requesting hosts 152a–152e. The set of alternative servers 158b and 158e are assigned an identical host (domain) name 114 (e.g., mirror_servers), and each of the alternative servers is also assigned a unique Internet Protocol address 116 (e.g., 209.180.55.2 and 209.180.55.9). It should be understood that some of the alternative servers 158b and 158e can be located at various locations throughout the world and that some of the alternative servers may be slightly adapted in terms of language or certain information for a particular local service.

The DNS servers 156a–156e are special servers that include a look-up table 111 for storing the host name 114 and unique IP addresses 116 of the alternative servers 158b and 158e located within the entire Internet 102 or in a local region of the Internet. The DNS servers 156a–156e also store the host names and IP addresses for all of the file servers 154a–154e connected to the Internet 102, but only the host names 114 and unique IP addresses 116 of the alternative servers 158b and 158e are discussed herein. The specific operation of the DNS servers 156a–156e is described below with respect to FIGS. 2–13.

The routers 105a–105e utilize the IP protocol to connect the respective user networks 150a–150e to the Internet 102. Each router 105a–105e contains a routing table 106 for storing hop counts derived from network topology information exchanged between the routers 105 within the Internet 102. The hop count is the total number of routers 105 and 105a–105e that an IP packet has to traverse from one of the requesting hosts 152a–152e to one of the alternative servers 158b or 158e. For example, if the requesting host 152a requested service from one of the alternative servers 158b and 158e it would take thirteen "13" hops to reach the alternative server 158e, and only seven "7" hops to reach the alternative server 158b. It should be known that the hop count for a certain destination (e.g., an alternative server 158b and 158e) can also be retrieved manually by the user with programs such as "traceroute" used on UNIX computers. In addition, the hop counts can also be found using a "record route" option in an IP header, but the result is not automatically returned to the requesting host 152a–152e.

Figure 12:
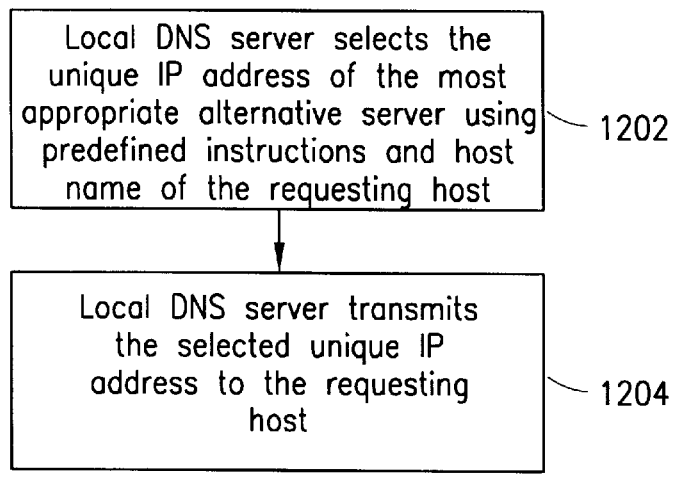
FIG. 12 is a simplified flowchart of a tenth embodiment of the selection step 210.
Figure 13:
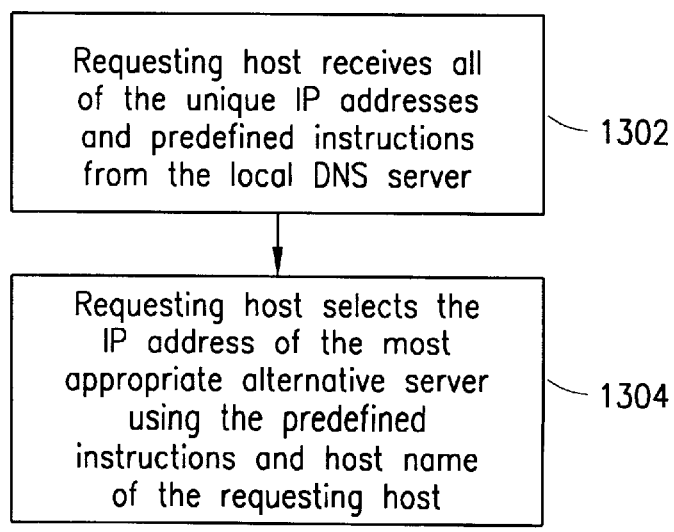
FIG. 13 is a simplified flowchart of an eleventh embodiment of the selection step 210.

Alternatively, each of DNS servers 156a–156e may store predefined instructions which can be used to determine the unique Internet Protocol address 116 of the most appropriate alternative server 158b or 158e using a host name of the particular requesting host 152a–152e (described in greater detail with respect to FIGS. 12–13).

The Internet system 100 can also be used to automatically select the closest alternative server 158b or 158e for use by and in response to the changing location of a mobile user. The mobile user may utilize a mobile terminal 118 which generally communicates with a data terminal equipment (DTE) 119 to allow packet data communications by way of the Internet 102. Alternatively, the mobile terminal 118 may incorporate the DTE 119 instead of connecting the DTE (as shown). In either case, the DTE 119 is assigned a unique IP address 116 (corresponding to the closest server 158b or 158e) that is stored in some or all of the DNS servers 156a–156e.

It should be understood that the illustrated configuration of the Internet system 100 is only one of many possible configurations that may form the system. A detailed discussion of the selection method 200 is provided below with respect to FIGS. 2–13 where eleven example embodiments are illustrated and described as to how the Internet system 100 functions in selecting the closest alternative server 158b or 158e.

Figure 2:
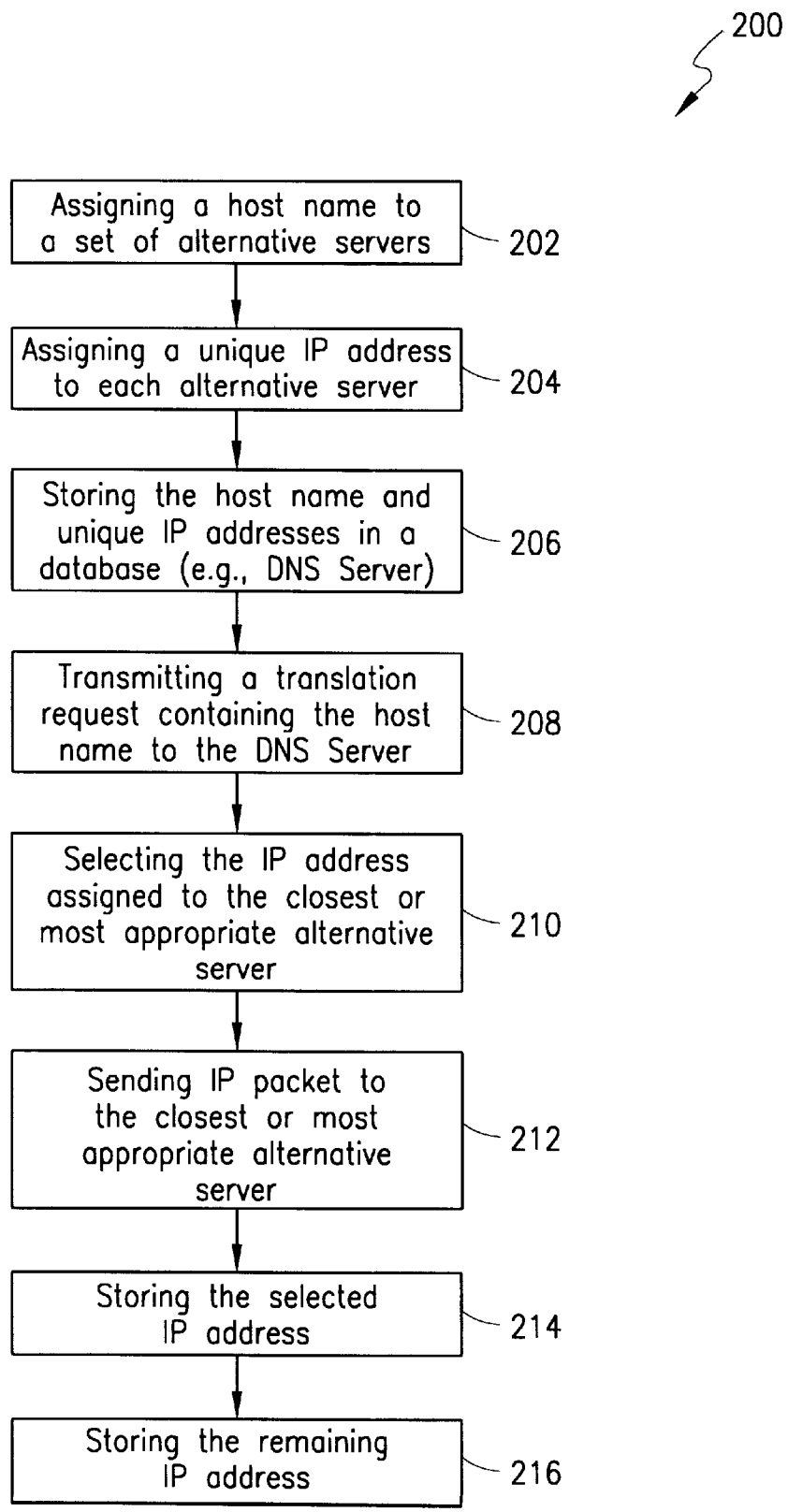
FIG. 2 is a simplified flowchart of a method for selecting a server (out of multiple servers providing the same service, e.g., mirror servers, or slightly adapted variants of the same service) located the nearest to a requesting host of the Internet system of FIG. 1B.

Referring to FIG. 2, there is illustrated a simplified flowchart of the selection method 200 used to select the closest or most appropriate alternative server 158b from the viewpoint of the requesting host 152a. Beginning at steps 202 and 204, the host name 114 is assigned (step 202) to the set of alternative servers 158b and 158e and a unique IP address 116 is assigned (step 204) to each alternative server so that no two alternative servers have the same IP address. For example, the set of alternative servers 158b and 158e can have the host name 114 of "mirror_servers", and IP addresses 116 of "209.180.55.2" (alternative server 158b) and "209.180.55.9" (alternative server 158e).

At step 206, the assigned host name 114 and the unique IP addresses 116 are stored in some or all of the look-up tables 111 of the DNS servers 156a–156e. The DNS servers 156a–156e can be at different levels of hierarchy such that one DNS server (e.g., DNS server 156a) may not store a particular host name and IP address while another DNS server (e.g., DNS server 156e) a step lower in the hierarchy may store the particular host name and IP addresses.

At step 208, the requesting host (e.g., requesting host 152a) transmits a translation request containing the host name 114 of the alternative servers 158b and 158e to one of the DNS servers (e.g., DNS server 156a). In the event one of the local DNS servers (e.g., DNS server 156a) does not recognize the host name 114 transmitted in the translation request, then the local DNS server 156a would refer the request to another DNS server (e.g., DNS server 156c) known as a DNS root server which locates yet another DNS server (e.g., DNS server 156e) that is a step lower in the hierarchy which may recognize the transmitted host name.

At step 210 and in response to the translation request, one of the unique IP addresses 116 corresponding to the alternative server 158b located the nearest to the requesting host 152a is selected. Alternatively, one of the unique IP addresses corresponding to the alternative server that is the most appropriate for the requesting host may be selected. There are nine exemplary ways of how to select the unique IP address 116 assigned to the closest alternative server 158b that are described below with respect to FIGS. 3–11. In addition, there are two exemplary ways of how the select the unique IP address 116 assigned to the most appropriate alternative server 158b that are described with respect to FIGS. 12–13. At step 212, the requesting host 152a then sends an IP packet to the closest or most appropriate alternative server 158b. And, at step 214 the unique IP address 116 associated with the closest or most appropriate alternative server 158b can be stored for a predetermined amount of time and used to send any subsequent IP packets.

At step 214, the remaining unique IP addresses 116 (e.g., IP address of 209.180.55.9) can be stored for a predetermined amount of time so as to be used in the event the closest alternative server 158b fails to respond to the requesting host 152a. In addition, the remaining IP addresses 116 may be stored in an order based on how close the remaining alternative servers (e.g., alternative server 158e) are located to the requesting host 152a. Alternatively, the remaining IP addresses 116 may be stored in an order based on how appropriate the remaining alternative server (e.g., alternative server 158e) are for the requesting host.

Figure 3:
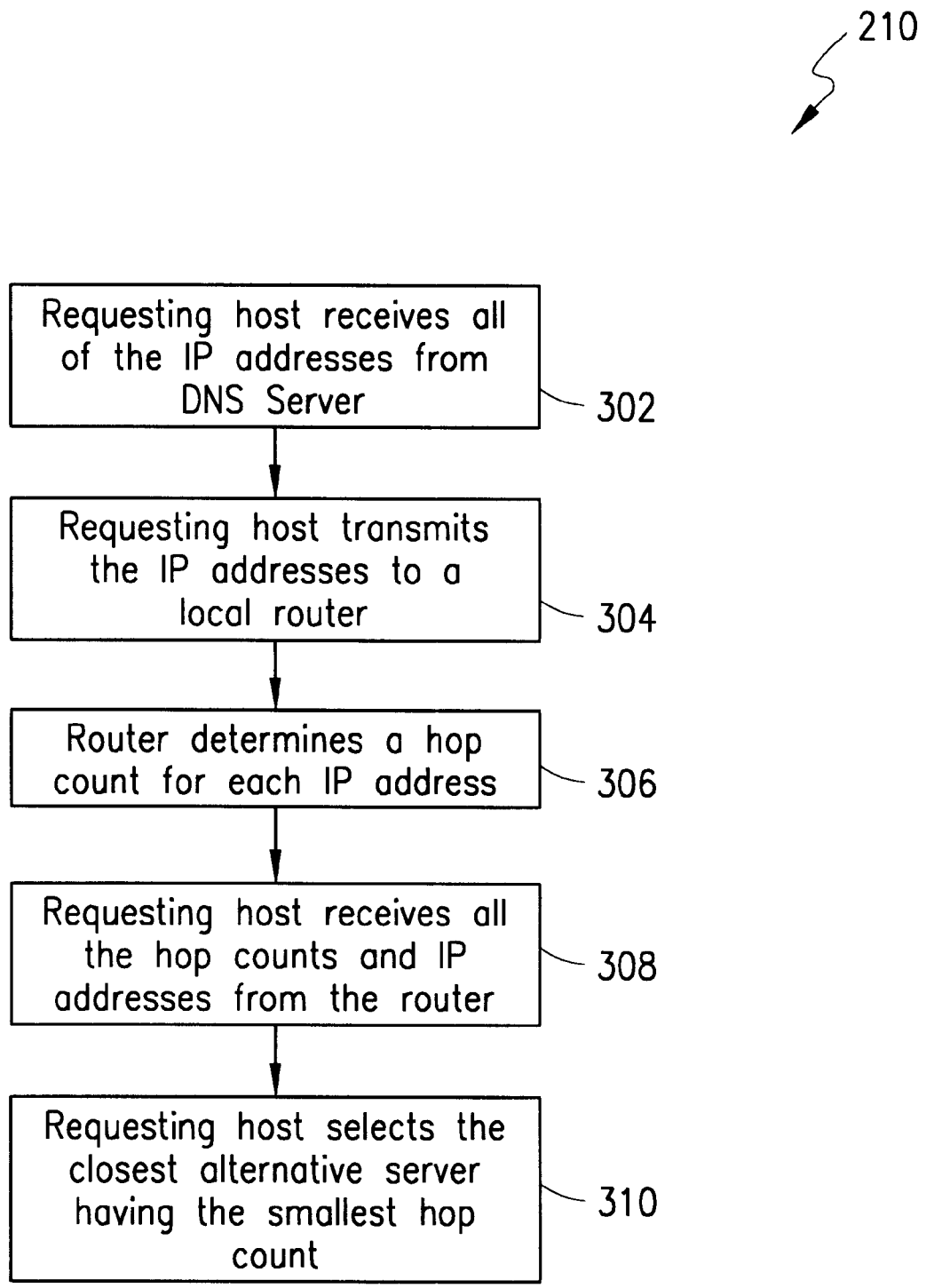
FIG. 3 is a simplified flowchart of a first embodiment of a selection step 210 of FIG. 2.

Referring to FIG. 3, there is illustrated a simplified flowchart of a first embodiment of the selection step 210 of FIG. 2. Beginning at step 302 and in response to the translation request, the requesting host 152a receives all of the unique IP addresses 116 associated with the transmitted host name 114 from the DNS server 156a. It is assumed for purposes of this discussion that the DNS server 156a recognized the transmitted host name 114.

At step 304, the requesting host 152a transmits a second request including all of the unique IP addresses 116 to the closest router 105a.

At step 306 and in response to the second request, the router 105a determines the hop count for each IP address 116. Again, each hop count indicates a number of the routers 105 and 105a–105e the IP packet from the requesting host 152a would have to traverse to reach a corresponding one of the alternative servers 158b and 158e. For example, there would be thirteen "13" routers traversed if the requesting host 152a requested service from the alternative server 158e and, in contrast, there would only be seven "7" routers traversed if the requesting host requested service from the alternative server 158b.

At step 308, the requesting host 152a receives all of the hop counts and IP addresses 116 from the local router 105a and selects, at step 310, the closest alternative server 158b having the smallest hop count.

Figure 4:
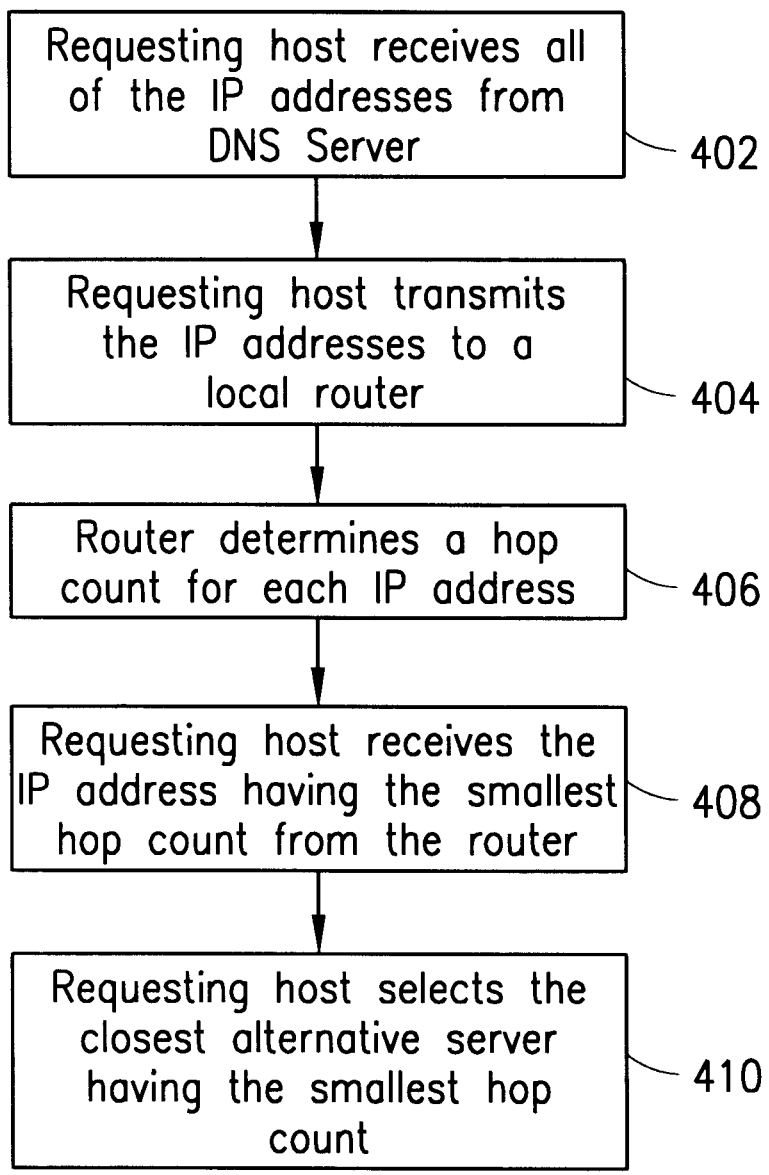
FIG. 4 is a simplified flowchart of a second embodiment of the selection step 210.

Referring to FIG. 4, there is illustrated a simplified flowchart of a second embodiment of the selection step 210 of FIG. 2. Beginning at step 402 and in response to the translation request, the requesting host 152a receives all of the unique IP addresses 116 associated with the transmitted host name 114 from the DNS server 156a. At step 404, the requesting host 152a transmits a second request including all of the unique IP addresses 116 to the closest router 105a. At step 406 and in response to the second request, the router 105a determines the hop count for each unique IP address 116. At step 408, the requesting host 152a receives the unique IP address 116 having smallest hop count from the router 105a and selects, at step 410, the closest alternative server 158b having the smallest hop count.

Figure 5:
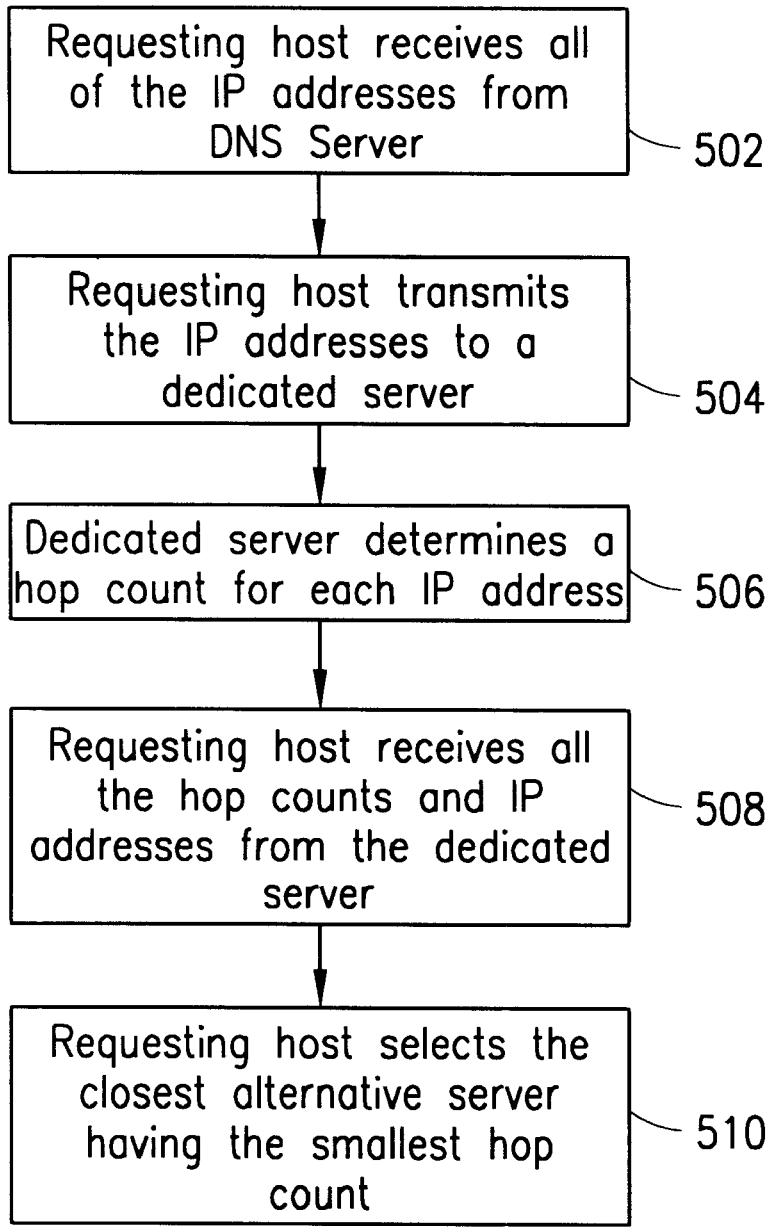
FIG. 5 is a simplified flowchart of a third embodiment of the selection step 210.

Referring to FIG. 5, there is illustrated a simplified flowchart of a third embodiment of the selection step 210 of FIG. 2. Beginning at step 502 and in response to the translation request, the requesting host 152a receives all of the unique IP addresses 116 associated with the transmitted host name 114 from the DNS server 156a. At step 504, the requesting host 152a transmits a second request including all of the unique IP addresses 116 to the dedicated server 157a. At step 506 and in response to the second request, the dedicated server 157a determines the hop count for each IP address 116. The dedicated server 157a is a specialized product configured to determine hop counts so that the router 105a need not be modified. At step 508, the requesting host 152a receives all of the hop counts and IP addresses 116 from the dedicated server 158a and selects, at step 510, the closest alternative server 158b having the smallest hop count.

Figure 6:
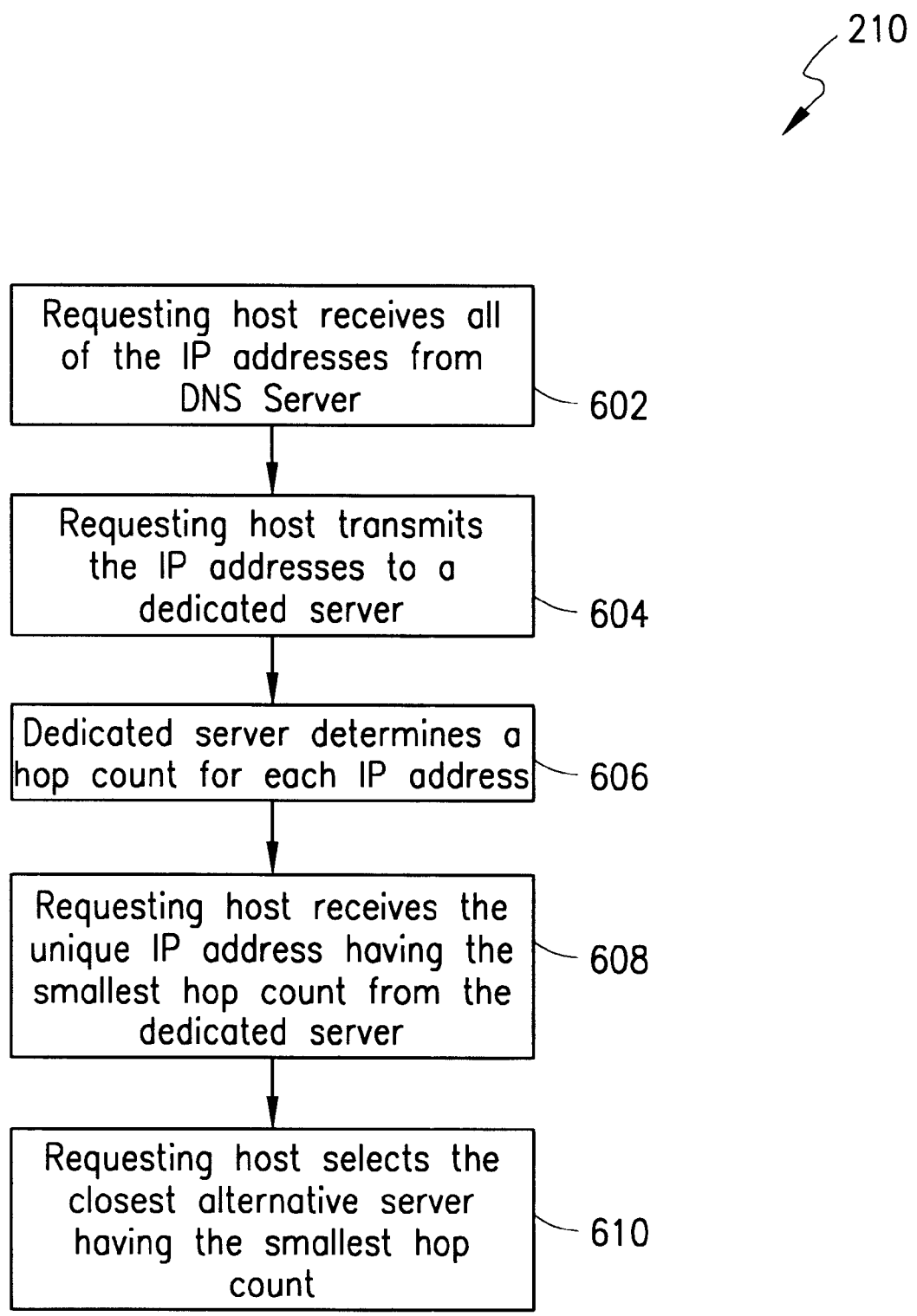
FIG. 6 is a simplified flowchart of a fourth embodiment of the selection step 210.

Referring to FIG. 6, there is illustrated a simplified flowchart of a fourth embodiment of the selection step 210 of FIG. 2. Beginning at step 602 and in response to the translation request, the requesting host 152a receives all of the unique IP addresses 116 associated with the transmitted host name 114 from the DNS server 156a. At step 604, the requesting host 152a transmits a second request including all of the unique IP addresses 116 to the dedicated server 157a. At step 606 and in response to the second request, the dedicated server 157*a* determines the hop count for each IP address 116. At step 608, the requesting host 152*a* receives the unique IP address 116 having the smallest hop count from the dedicated server 157*a* and selects, at step 610, the closest alternative server 158*b* associated with the smallest hop count.

Figure 7:
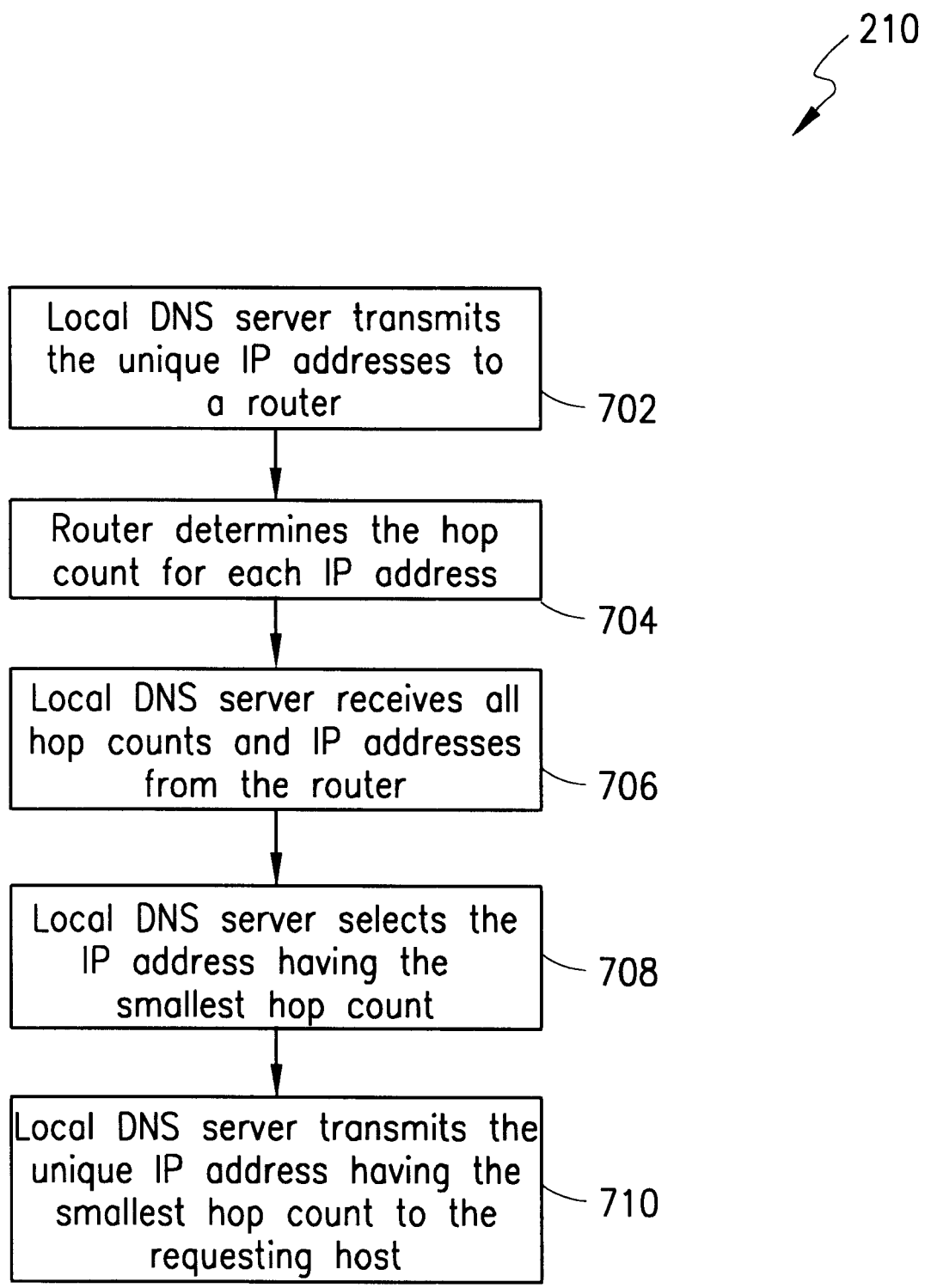
FIG. 7 is a simplified flowchart of a fifth embodiment of the selection step 210.

Referring to FIG. 7, there is illustrated a simplified flowchart of a fifth embodiment of the selection step 210 of FIG. 2. Beginning at step 702 and in response to the translation request, the DNS server 156*a* which is coupled with the same user network 150*a* as the requesting host 152*a* operates to transmit to the router 105*a* a second request including all of the unique IP addresses 116 associated with the transmitted host name 114. Alternatively, the DNS server 156*a* can be attached to the user network 150*a* or set of networks (not shown) when a single firewall is used for the set of networks.

At step 704 and in response to the second request, the local router 105*a* determines the hop count for all of the unique IP addresses 116. At step 706, the DNS server 156*a* receives all of the hop counts and unique IP addresses 116 from the router 105 and selects, at step 708, the unique IP address 116 having the smallest hop count. At step 710, the DNS server 156*a* transmits the IP address 116 having the smallest hop count to the requesting host 152*a*.

Figure 8:
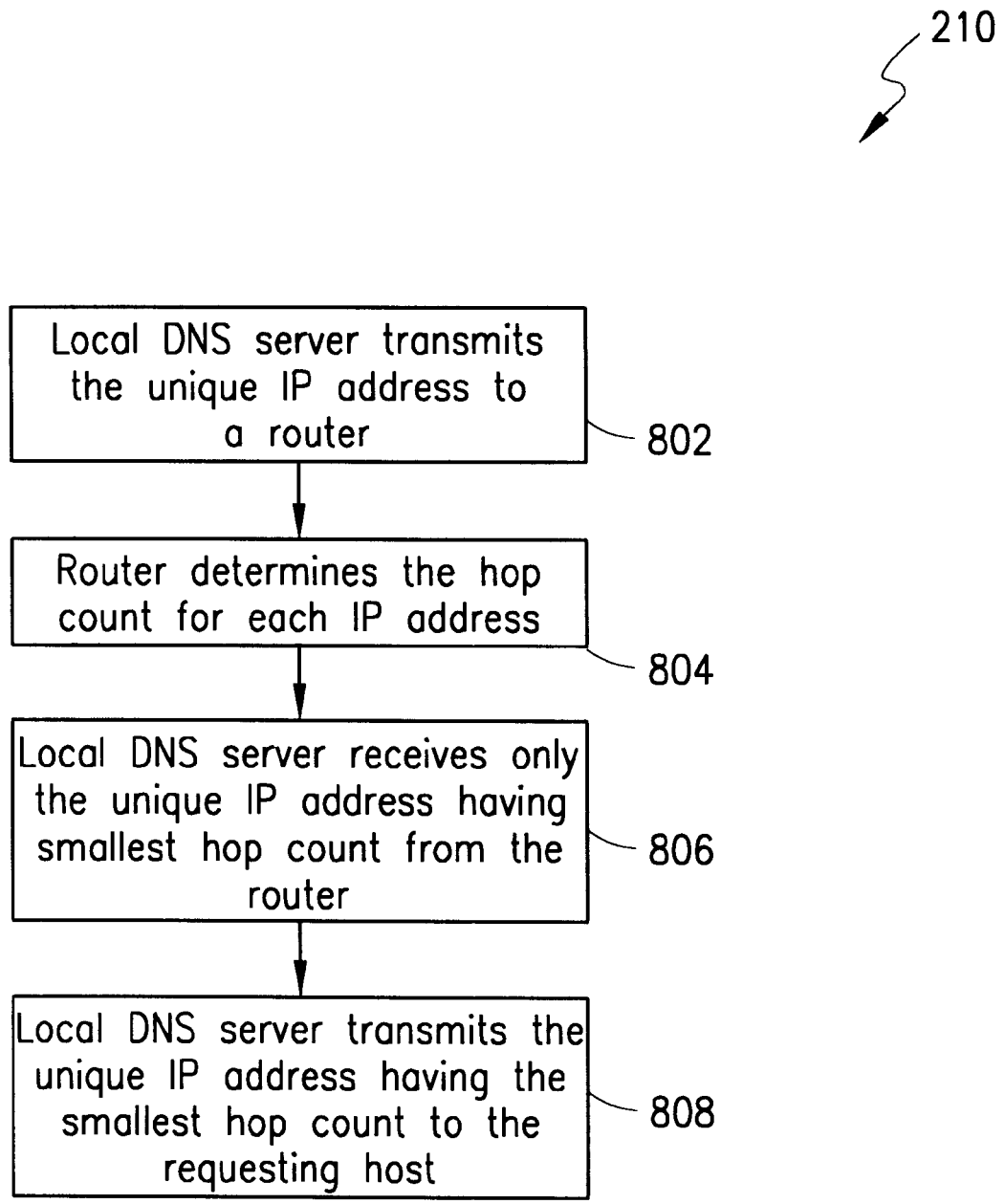
FIG. 8 is a simplified flowchart of a sixth embodiment of the selection step 210.

Referring to FIG. 8, there is illustrated a simplified flowchart of a sixth embodiment of the selection step 210 of FIG. 2. Beginning at step 802 and in response to the translation request, the DNS server 156*a* which is coupled with the same user network 150*a* as the requesting host 152*a* operates to transmit to the router 150*a* a second request including all of the unique IP addresses 116 associated with the transmitted host name 114. Alternatively, the DNS server 156*a* can be attached to the user network 150*a* or set of networks (not shown) when a single firewall is used for the set of networks.

At step 804 and in response to the second request, the local router 105*a* determines the hop count for each of the unique IP addresses 116. At step 806, the DNS server 156*a* receives only the unique IP address 116 having the smallest hop count from the router 105*a* and transmits, at step 808, to the requesting host 152*a* the unique IP address 116 having the smallest hop count which corresponds to the closest alternative server 158*b*.

Figure 9:
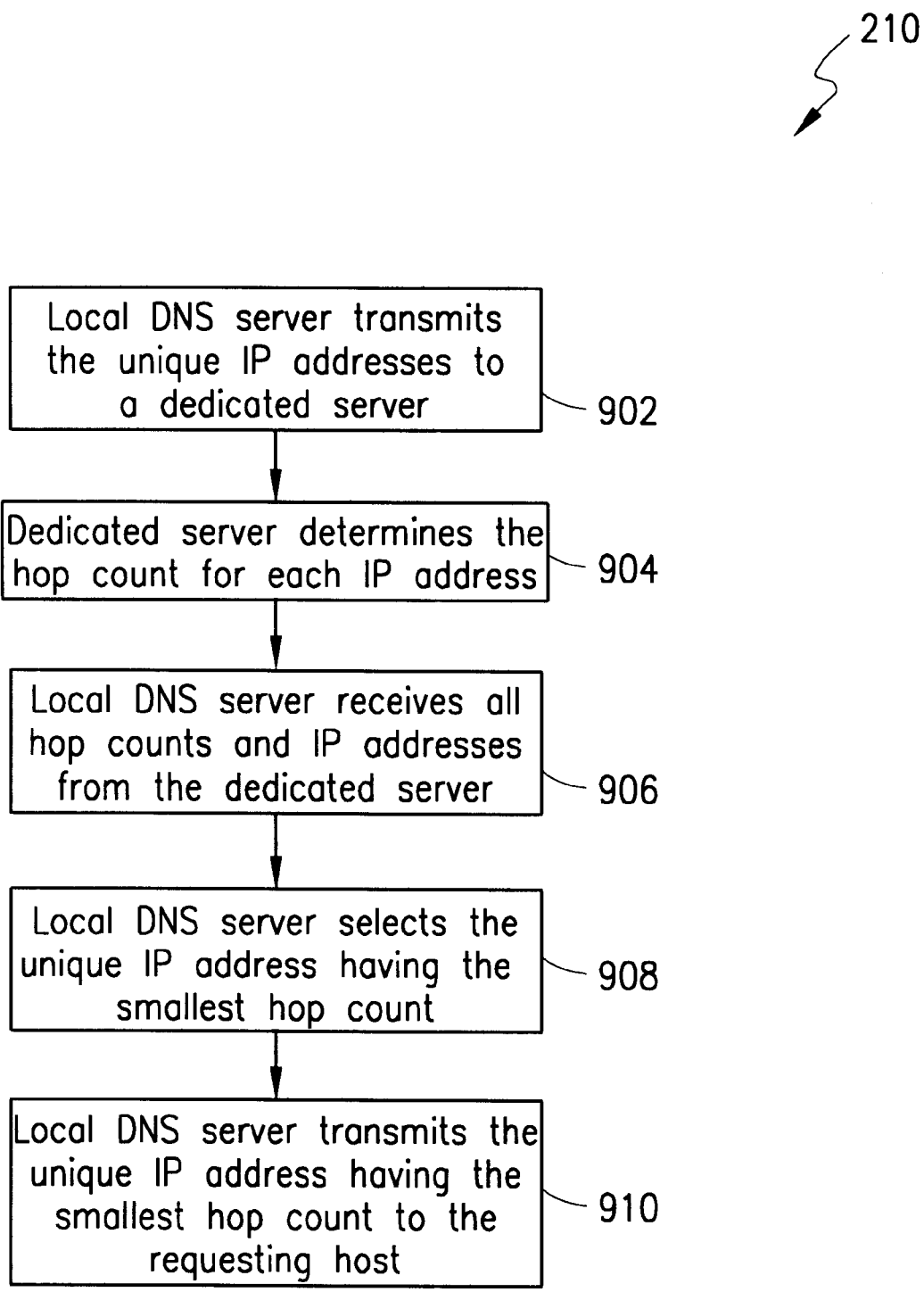
FIG. 9 is a simplified flowchart of a seventh embodiment of the selection step 210.

Referring to FIG. 9, there is illustrated a simplified flowchart of a seventh embodiment of the selection step 210 of FIG. 2. Beginning at step 902 and in response to the translation request, the DNS server 156*a* which is coupled with the same user network 150*a* as the requesting host 152*a* operates to transmit to the dedicated server 157*a* a second request including all of the unique IP addresses 116 associated with the transmitted host name 114. Alternatively, the DNS server 156*a* can be attached to the user network 150*a* or set of networks (not shown) when a single firewall is used for the set of networks.

At step 904 and in response to the second request, the dedicated server 157*a* determines the hop count for all of the IP addresses 116. At step 906, the DNS server 156*a* receives all of the hop counts and IP addresses 116 from the dedicated server 157*a* and selects, at step 908, the unique IP address 116 having the smallest hop count. At step 910, the DNS server 156*a* transmits the IP address 116 having the smallest hop count to the requesting host 152*a*.

Figure 10:
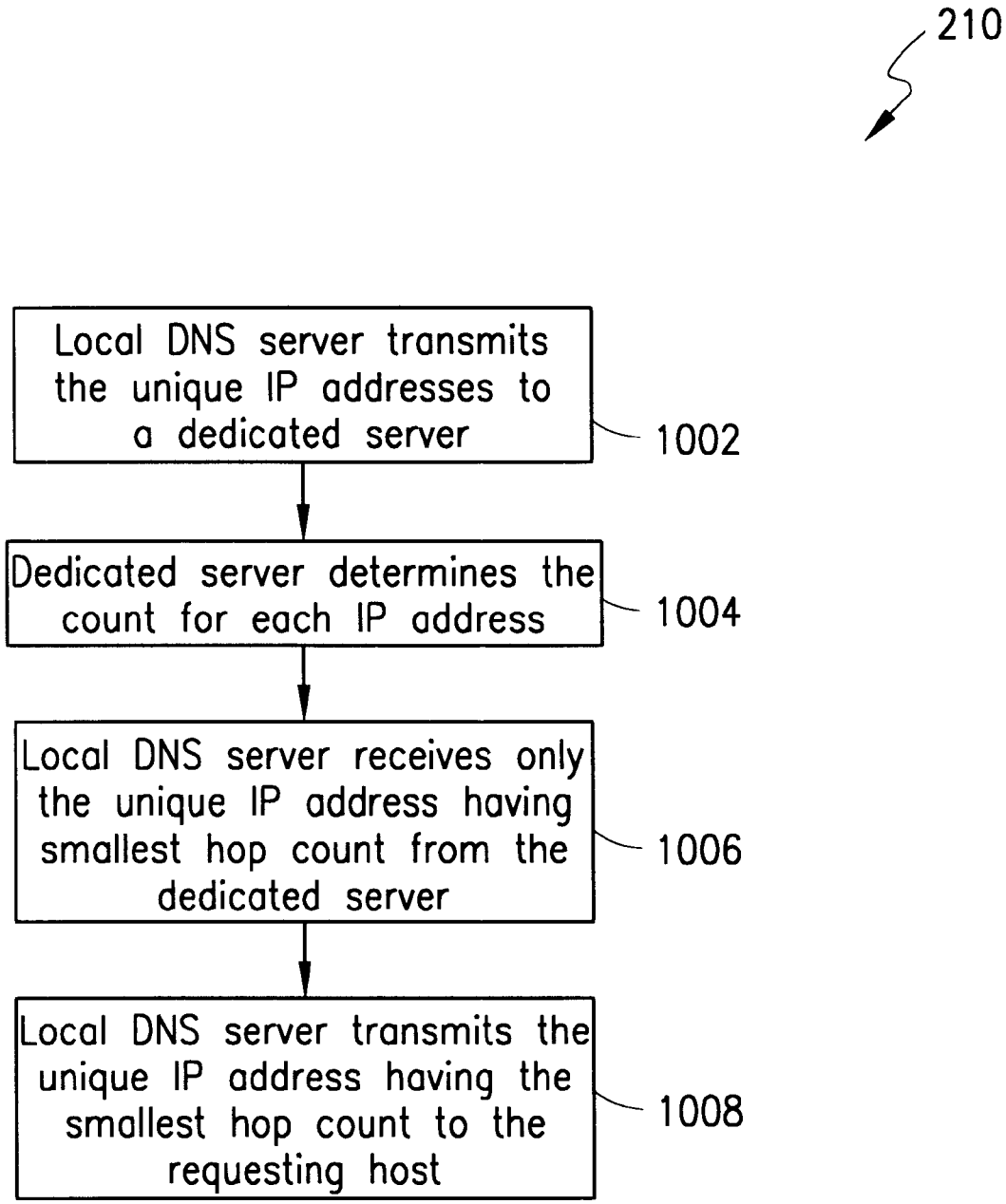
FIG. 10 is a simplified flowchart of an eighth embodiment of the selection step 210.

Referring to FIG. 10, there is illustrated a simplified flowchart of an eighth embodiment of the selection step 210 of FIG. 2. Beginning at step 1002 and in response to the translation request, the DNS server 156*a* which is coupled with the same user network 150*a* as the requesting host 152*a* operates to transmit to the dedicated server 157*a* a second request including all of the unique IP addresses 116 associated with the transmitted host name 114. Alternatively, the DNS server 156*a* can be attached to the user network 150*a* or set of networks (not shown) when a single firewall is used for the set of networks.

At step 1004 and in response to the second request, the dedicated server 157*a* determines the hop count for each of the unique IP addresses 116. At step 1006, the DNS server 156*a* receives only the unique IP address having the smallest hop count from the dedicated server 156*a* and transmits, at step 1008, to the requesting host 152*a* the unique IP address 116 having the smallest hop count which corresponds to the closest alternative server 158*b*.

Figure 11:
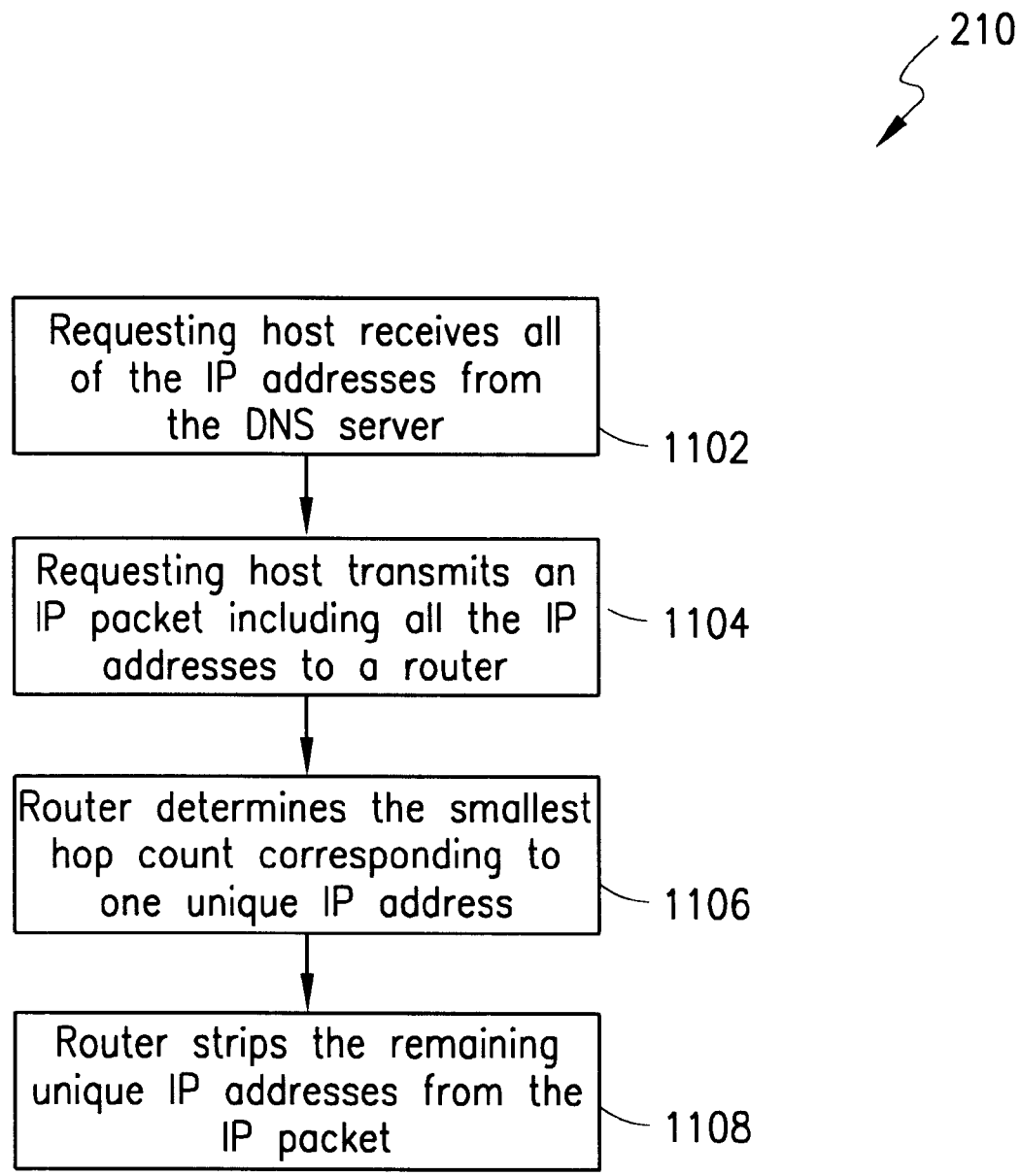
FIG. 11 is a simplified flowchart of a ninth embodiment of the selection step 210.

Referring to FIG. 11, there is illustrated a simplified flowchart of a ninth embodiment of the selection step 210 of FIG. 2. Beginning at step 1102 and in response to the translation request, the requesting host 152*a* receives all of the unique IP addresses 116 associated with the transmitted host name 114 from the DNS server 156*a*.

At step 1104, the requesting host 152*a* transmits the IP packet including all of the received IP addresses 116 to the local router 105*a*. At step 1106, the local router 105*a* determines the smallest hop count corresponding to one unique IP address 116 and associated with the closest alternative server 158*b* and, at step 1108, strips the remaining IP addresses 116 from the IP packet.

After the router 150*a* transmits the IP packet to the closest mirror server 158*b*, the requesting host 152*a* receives a reply message (e.g., a Transmission Control Protocol (TCP) acknowledgment message) and it is then known by the requesting host 152*a* which unique IP address 116 was selected by the router by reading the IP address of the closest server (which is the sender of the reply message). Thereafter, the requesting host 152*a* in sending subsequent IP packets to the same destination (closest alternative server) need only include the known unique IP address in the IP packets transmitted to the router.

Referring to FIG. 12, there is illustrated a simplified flowchart of a tenth embodiment of the selection step 210 of FIG. 2. Beginning at step 1202, the DNS server 156*a* selects the unique IP address 116 of the most appropriate alternative server 158*b* using predefined instructions and the host name of the requesting host 152*a*. The predefined instructions indicate the unique IP address 116 of the most appropriate alternative server 158*b* based on a class of the host name of the requesting host 152*a*. At step 1204, the DNS server 156*a* transmits the selected IP address 116 of the most appropriate alternative server 158*b* to the requesting host 152*a*.

The most appropriate alternative server in may circumstances is the closest alternative server 158*b*. However, the selected server may not be the closest alternative server 158*b* when (for example) the requesting host 152*a* located in Japan has a host name ending with ".se" (the country code of Sweden), then the selected server may be a server using the Swedish language (i.e., language adaptation) which is not necessarily the closest to the requesting host.

In the event, the host name of the requesting host 152*a* does not belong to one of the defined classes either one of the IP addresses 116 may be used as a default address or one of the above-mentioned selection methods can be used (see FIGS. 3–11).

Referring to FIG. 13, there is illustrated simplified flowchart of an eleventh embodiment of the selection step 210 of FIG. 2. Beginning at step 1302 and in response to the translation request, the requesting host 152a receives all of the unique IP addresses 116 and the predefined instructions from the DNS server 156a.

At step 1304, the requesting host 152a selects the IP address 116 of the most appropriate server 158b using the predefined instructions and the host name of the requesting host. Again, the predefined instructions indicate the unique IP address 116 of the most appropriate alternative server 158b based on a class of the host name of the requesting host 152a. And, as mentioned above, if the host name of the requesting host 152a does not belong to one of the defined classes either one of the unique IP addresses 116 can be used as a default address or one of the above-mentioned selection methods can be used (see FIGS. 3–11).

Again, the most appropriate alternative server in may circumstances is the closest alternative server 158b. However, the selected server may not be the closest alternative server 158b when (for example) the requesting host 152a located in Japan has a host name ending with ".se" (the country code of Sweden), the selected server may be a server using the Swedish language (i.e., language adaptation) which is not necessarily the closest to the requesting host.

From the foregoing, it can be readily appreciated by those skilled in the art that the present invention provides a method and Internet system that selects an alternative server located the closest to a user or alternatively an alternative server that is the most appropriate for a user. Also, the Internet system and method as disclosed can operate to select either the closest alternative server using the hop counts based on network topology or the most appropriate alternative server using predefined instructions based on a particular class of a user. In addition, the present invention reduces the overall load in the network by reducing the number of routers that have to be traversed by IP packets.

Although several embodiments of the method and Internet system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for selecting a closest server from a plurality of servers, said method comprising the steps of:
   assigning a host name to the plurality of servers;
   assigning a unique address to each of the plurality of servers;
   storing the host name and the plurality of unique addresses in a database;
   transmitting from a requesting host to the database a translation request including the host name of the plurality of servers; and
   selecting, responsive to the translation request, the unique address assigned to the closest server located the nearest to the requesting host comprising the steps of:
      transmitting a second request including the plurality of unique Internet Protocol addresses from at least one of the requesting host and Domain Name System server to at least one of a router and a dedicated server; and
      determining, responsive to the second request, a hop count for each unique Internet Protocol address.

2. The method of claim 1, further comprising the step of sending a packet from the requesting host to the closest server utilizing the selected unique address of the closest server.

3. The method of claim 1, further comprising the step of storing the selected unique address of the closest server for a predetermined amount of time.

4. The method of claim 3, further comprising the step of storing the remaining unique addresses for use when the closest server fails to respond to the requesting host.

5. The method of claim 4, wherein the step of storing the remaining unique addresses further includes ordering the remaining unique addresses based on how close the remaining servers are located to the requesting host.

6. The method of claim 1, wherein said step of transmitting a translation request further includes bypassing another database to reach the database when said another database fails to recognize the host name transmitted within the translation request.

7. The method of claim 1, wherein said plurality of servers further includes a plurality of an mirror servers or a plurality of alternative servers.

8. The method of claim 1, wherein said hop count is indicative of a number of routers a packet from the requesting host would have to traverse to reach a corresponding one of the plurality of servers.

9. A method for selecting a most appropriate server from a plurality of servers, said method comprising the steps of:
   assigning a host name to the plurality of servers;
   assigning a unique Internet Protocol address to each of the plurality of servers;
   storing the host name and the plurality of unique addresses in a database;
   transmitting from a requesting host to the database a translation request including the host name of the plurality of servers; and
   selecting, responsive to the translation request, the unique Internet Protocol address assigned to the server that is the most appropriate for the requesting host, said step of selecting comprising the steps of:
      receiving, responsive to the first request, the plurality of unique Internet Protocol addresses and predefined instructions, said requesting host receives the plurality of unique Internet Protocol addresses and predefined instructions from the Domain Name System server; and
      determining the selected unique Internet Protocol address of the most appropriate server using predefined instructions and a host name of the requesting host, said predefined instructions indicate the selected unique Internet Protocol address of the most appropriate server based on a class of the host name of the requesting host.

10. A method for establishing Internet Protocol communication from a requesting host to a closest server selected from a plurality of servers, said method comprising the steps of:
   assigning a common host name and a unique Internet Protocol address to each server;
   storing the common host name and the plurality of unique Internet Protocol addresses in a Domain Name System server;
   transmitting a first request including the common host name from a requesting host to the Domain Name System server;
   selecting, responsive to the first request, the unique Internet Protocol address assigned to the closest server located the nearest to the requesting host comprising the steps of:
      transmitting a second request including the plurality of unique Internet Protocol addresses from at least one of the requesting host and the Domain Name System server to at least one of a router and a dedicated server; and determining, responsive to the second request, a hop count for each unique Internet Protocol address; and sending an Internet Protocol packet from the requesting host to the closest server utilizing the selected unique Internet Protocol address.

11. The method of claim 10, wherein the step of selecting the unique Internet Protocol address assigned to the closest server further includes, before said step of transmitting a second request, the step of:

receiving, responsive to the first request, the plurality of unique Internet Protocol addresses, said requesting host receives the plurality of unique Internet Protocol addresses from the Domain Name System server;

receiving, following said step of determining, at least one of the unique Internet Protocol address of the closest server and each hop count and each unique Internet Protocol address at the requesting host; and selecting the unique Internet Protocol address of the closest server associated with the smallest hop count, wherein each hop count indicates a number of routers the Internet Protocol packet from the requesting host would have to traverse to reach a corresponding one of the plurality of servers.

12. The method of claim 10, wherein the step of selecting the unique Internet Protocol address assigned to the closest server further includes the steps of:

receiving at least one of the unique Internet Protocol address of the closest server and each hop count and each unique Internet Protocol address at the Domain Name System server; and selecting within the Domain Name System server and transmitting to the requesting host the unique Internet Protocol address of the closest server having the smallest hop count, wherein said requesting host and Domain Name System server are attached to a common network.

13. The method of claim 10, wherein said plurality of servers further includes a plurality of mirror servers or a plurality of alternative servers.

14. A method for establishing Internet Protocol communication from a requesting host to a most appropriate server selected from a plurality of servers, said method comprising the steps of:

assigning a common host name and a unique Internet Protocol address to each server;

storing the common host name and the plurality of unique Internet Protocol addresses in a Domain Name System server;

transmitting a first request including the common host name from a requesting host to the Domain Name System server;

selecting, responsive to the first request, the unique Internet Protocol address assigned to the server that is the most appropriate for the requesting host; and sending an Internet Protocol packet from the requesting host to the most appropriate server utilizing the selected unique Internet Protocol address, wherein said step of selecting the unique Internet Protocol address assigned to the most appropriate server further includes the steps of:

receiving, responsive to the first request, the plurality of unique Internet Protocol addresses and predefined instructions, said requesting host receives the plurality of unique Internet Protocol addresses and predefined instructions from the Domain Name System server; and determining and selecting the unique Internet Protocol address of the most appropriate server using the predefined instructions and a host name of the requesting host, said predefined instructions indicate the unique Internet Protocol address of the most appropriate server based on a class of the host name of the requesting host.

15. An Internet system for selecting a closest server from a plurality of servers which are each assigned an identical host name and a unique Internet Protocol addresses, said Internet system comprising:

a database for storing the identical host name and the plurality of unique Internet Protocol addresses;

a requester coupled to the database for transmitting to the database a translation request including the identical host name; and a selector coupled to the database, responsive to the translation request, for selecting the unique Internet Protocol address assigned to the closest server located the nearest to the requesting host, wherein said selector further includes:

a second requester for transmitting to at least one of a router and a dedicated server a second request including the plurality of unique Internet Protocol addresses; and a counter for determining a hop count for each Internet Protocol address in response to the second request.

16. The Internet system of claim 15, wherein said requesting host further includes means for sending a packet to the closest server utilizing the selected unique Internet Protocol address.

17. The Internet system of claim 15, wherein a selected one of said requesting host and said selecting means further includes means for storing the selected unique Internet Protocol address of the closest server for a predetermined amount of time.

18. The Internet system of claim 15, wherein a selected one of said requesting host and said selecting means further includes means for storing the remaining unique Internet Protocol addresses for use when the closest server fails to respond to the requesting host.

19. The Internet system of claim 18, wherein said means for storing the remaining unique Internet Protocol addresses further includes means for ordering the remaining unique Internet Protocol addresses based on how close the remaining servers are located to the requesting host.

20. The Internet system of claim 15, wherein said plurality of servers further includes a plurality of mirror servers or a plurality of alternative servers.

21. The Internet system of claim 15, wherein said selecting means further includes means for determining the selected unique Internet Protocol address based on a smallest of the hop counts indicative of a least number of routers a packet from the requesting host would have to traverse to reach the closest server.

22. An Internet system for selecting a most appropriate server from a plurality of servers which are each assigned an identical host name and a unique Internet Protocol addresses, said Internet system comprising:

a database for storing the identical host name and the plurality of unique Internet Protocol addresses;

a requester coupled to the database for transmitting to the database a translation request including the identical host name; and a selector coupled to the database, responsive to the translation request, for selecting the unique Internet Protocol address assigned to the server that is the most appropriate for the requesting host, wherein said selecting means further includes:

means for receiving the plurality of unique Internet Protocol addresses and predefined instructions from the Domain Name System server; and means for determining the selected unique Internet Protocol address using the predefined instructions and a host name of the requesting host; said predefined instructions indicate the selected unique Internet Protocol address of the most appropriate server based on a class of the host name of the requesting host.

23. An Internet system for selecting a server over another server, each server is assigned an identical host name and a unique Internet Protocol addresses, said Internet system comprising:

a database for storing the identical host name and the plurality of unique Internet Protocol addresses;

a requester coupled to the database for transmitting to the database a translation request including the identical host name; and a selector coupled to the database, responsive to the translation request, for selecting the unique Internet Protocol address assigned to either the server or the another server based on which of the servers is located nearer to the requester, wherein said selector further includes:

a second requester for transmitting to at least one of a router and a dedicated server a second request including the plurality of unique Internet Protocol addresses;

a counter for determining a hop count for each Internet Protocol address in response to the second request.

24. A method for selecting a server over another server, said method comprising the steps of:

assigning a common host name to said server and said another server;

assigning a unique address to said server and said another server;

storing the common host name and the plurality of unique addresses in a database;

transmitting from a requester to the database a translation request including the common host name of the server and the another servers; and selecting, responsive to the translation request, the unique address assigned to either the server or the another server based on which of the servers is located nearer to the requester comprising the steps of:

transmitting a second request including the plurality of unique Internet Protocol addresses from at least one of the requesting host and Domain Name System server to at least one of a router and a dedicated server; and determining, responsive to the second request, a hop count for each unique Internet Protocol address.

25. An Internet system for selecting a server over another server, each server is assigned an identical host name and a unique Internet Protocol addresses, said Internet system comprising:

a database for storing the identical host name and the plurality of unique Internet Protocol addresses;

a requester coupled to the database for transmitting to the database a translation request including the identical host name; and a selector coupled to the database, responsive to the translation request, for selecting the unique Internet Protocol address assigned to either the server or the another server based on which of the servers is more appropriate for the requester, wherein said selector further includes:

means for receiving the plurality of unique Internet Protocol addresses and predefined instructions from a Domain Name System server; and means for determining the selected unique Internet Protocol address using the predefined instructions and a host name of the requesting host; said predefined instructions indicate the selected unique Internet Protocol address of the most appropriate server based on a class of the host name of the requesting host.

26. A method for selecting a server over another server, said method comprising the steps of:

assigning a common host name to said server and said another server;

assigning a unique address to said server and said another server;

storing the common host name and the plurality of unique addresses in a database;

transmitting from a requester to the database a translation request including the common host name of the server and the another servers; and selecting, responsive to the translation request, the unique address assigned to either the server or the another server based on which of the servers is more appropriate for the requester comprising the steps of:

means for receiving the plurality of unique Internet Protocol addresses and predefined instructions from a Domain Name System server; and means for determining the selected unique Internet Protocol address using the predefined instructions and a host name of the requesting host; said predefined instructions indicate the selected unique Internet Protocol address of the most appropriate server based on a class of the host name of the requesting host.

27. A method for establishing Internet Protocol communication from a requesting host to a closest server selected from a plurality of servers, said method comprising the steps of:

assigning a common host name and a unique Internet Protocol address to each server;

storing the common host name and the plurality of unique Internet Protocol addresses in a Domain Name System server;

transmitting a first request including the common host name from a requesting host to the Domain Name System server;

receiving, responsive to the first request, the plurality of unique Internet Protocol addresses, said requesting host receives the plurality of unique Internet Protocol addresses from the Domain Name System server;

transmitting an Internet Protocol packet including the plurality of unique Internet Protocol addresses from the requesting host to a router;

determining, in response to receiving the Internet Protocol packet, the unique Internet Protocol address of the closest server having a hop count indicating a smallest number of routers the Internet Protocol packet transmitted from the requesting host would have to traverse to reach the closest server;

selecting, at the router, said Internet Protocol address of the closest server;

stripping the remaining unique Internet Protocol addresses from the Internet Protocol packet; and forwarding the Internet Protocol packet from the router to the closest server utilizing the selected unique Internet protocol address.

* * * * *